US010279854B2

(12) United States Patent
Lee

(10) Patent No.: US 10,279,854 B2
(45) Date of Patent: May 7, 2019

(54) APPARATUS FOR CUTTING A TINTED FILM FOR A VEHICLE WINDOW AND A CUTTING METHOD USING THE APPARATUS

(71) Applicant: Dongkee Lee, Seoul (KR)

(72) Inventor: Dongkee Lee, Seoul (KR)

( * ) Notice: Subject to any disclaimer, the term of this patent is extended or adjusted under 35 U.S.C. 154(b) by 211 days.

(21) Appl. No.: 15/323,781

(22) PCT Filed: Sep. 8, 2015

(86) PCT No.: PCT/KR2015/009453
§ 371 (c)(1),
(2) Date: Jan. 4, 2017

(87) PCT Pub. No.: WO2016/068477
PCT Pub. Date: May 6, 2016

(65) Prior Publication Data
US 2017/0166273 A1    Jun. 15, 2017

(30) Foreign Application Priority Data

Oct. 27, 2014    (KR) .................. 10-2014-0146316

(51) Int. Cl.
| | |
|---|---|
| *B62D 65/06* | (2006.01) |
| *B26D 7/01* | (2006.01) |
| *B26D 7/20* | (2006.01) |
| *B26B 29/06* | (2006.01) |
| *H05F 1/00* | (2006.01) |
| *B26D 5/00* | (2006.01) |

(Continued)

(52) U.S. Cl.
CPC .............. *B62D 65/06* (2013.01); *B26B 29/06* (2013.01); *B26D 5/005* (2013.01); *B26D 7/01* (2013.01);
(Continued)

(58) Field of Classification Search
CPC .. B62D 65/06; B26D 2007/208; B26D 7/088; B26B 29/06
See application file for complete search history.

(56) References Cited

U.S. PATENT DOCUMENTS

| | | | | |
|---|---|---|---|---|
| 4,440,185 A | * | 4/1984 | Wiltse | ............... B26D 7/088 134/104.4 |
| 5,873,975 A | * | 2/1999 | Benoit | ............... B29C 63/0004 156/234 |

(Continued)

FOREIGN PATENT DOCUMENTS

| | | |
|---|---|---|
| JP | H06-255873 | 9/1994 |
| JP | 2003-019696 A | 1/2003 |

(Continued)

OTHER PUBLICATIONS

Machine Translation of KR101399233B1.*
(Continued)

*Primary Examiner* — Moshe Wilensky
*Assistant Examiner* — Kyle A Cook
(74) *Attorney, Agent, or Firm* — Korus Patent, LLC; Seong Il Jeong

(57) ABSTRACT

An apparatus for cutting a tinted film for a vehicle window is disclosed, the apparatus comprising: a housing having a top portion, the housing having a cutting-line displaying/displayed plate as a front portion thereof, wherein the cutting-line displaying/displayed plate is tilted such that the film is supported on the plate; a top horizontal extension from the top portion of the housing; a contaminant remover disposed on and beneath the top horizontal extension; and a cutting-line formation device housed in the housing, wherein the cutting-line formation device is configured to send cutting line data for the film to the cutting-line displaying/displayed plate when the cutting-line displaying/displayed plate includes a display panel; or the cutting-line formation device is configured to irradiate a beam corresponding to the cutting line data onto the cutting-line displaying/displayed plate when the cutting-line formation device include a beam projector.

2 Claims, 12 Drawing Sheets

(51) Int. Cl.
  *B26D 7/08* (2006.01)
  *B26D 7/18* (2006.01)
  *B60J 3/00* (2006.01)

(52) U.S. Cl.
  CPC ........... *B26D 7/088* (2013.01); *B26D 7/1845* (2013.01); *B26D 7/20* (2013.01); *H05F 1/00* (2013.01); *B26D 2005/002* (2013.01); *B60J 3/007* (2013.01)

(56) References Cited

U.S. PATENT DOCUMENTS

2010/0282283 A1* 11/2010 Bauer ................. B05B 13/0285
                                                     135/96
2014/0097636 A1* 4/2014 Snider ..................... B60J 1/001
                                                     296/97.8

FOREIGN PATENT DOCUMENTS

| KR | 10-2002-0027168 A | 4/2002 |
| KR | 10-2002-0037307 A | 5/2002 |
| KR | 10-1399233 B1 | 5/2014 |
| KR | 101399233 B1 * | 5/2014 |

OTHER PUBLICATIONS

Prior Art Figures of Hector (YouTube, https://www.youtube.com/watch?v=cZdYXp_mC-A, Published Jan. 23, 2013).*
Screenshot of Sorrell (Wired, https://www.wired.com/2011/08/clean-like-harry-potter-with-this-dust-busting-magic-wand/, Published Aug. 5, 2011).*

* cited by examiner

APPARATUS FOR CUTTING A TINTED FILM FOR A VEHICLE WINDOW AND A CUTTING METHOD USING THE APPARATUS

CROSS-REFERENCE TO RELATED APPLICATION

This application claims the benefit of Korea patent application No. 10-2014-0146316 filed on Oct. 27, 2014, the entire content of which is incorporated herein by reference for all purposes as if fully set forth herein.

BACKGROUND

Field of the Present Disclosure

The present disclosure relates to an apparatus for cutting a tinted film for a vehicle window and a method for cutting a tinted film for a vehicle window. More particularly, the present disclosure relates to an apparatus for cutting a tinted film for a vehicle window and a method for cutting a tinted film for a vehicle window wherein a cutting line is indicated on the tinted film using a display panel or a beam projector.

Discussion of Related Art

Generally, since blinds or curtains could not be installed on the rear windshield glass or door glass of automobiles, it is widely used to attach a tanning film or a light-shielding adhesive sheet.

In the conventional film cutting work for attaching such a film for car tanning, a conventional guide frame is used, so that a large amount of guide frames corresponding to various kinds of vehicles must be stored. There is a problem in that a long time is consumed to apply the films on many types of the glasses and the production efficiency is lowered.

In order to solve such a problem, Korean patent No. 10-1399233 which is assigned to the present applicant discloses that a transparent or semi-transparent film can be accurately cut by irradiating a cutting line using a beam projector.

However, in the above patent document, there has been a troublesome problem to remove foreign substances such as dust during the cutting operation due to the dust sticking to the film for tinting the vehicle, before cutting the film for the vehicle tinting and attaching the same to the vehicle glass. It is necessary to manually cut various shapes of the film according to the shapes of the vehicle glasses, so that the worker's fatigue is increased and the work efficiency is lowered.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide an apparatus for cutting a tinted film for a vehicle window and a method for cutting a tinted film for a vehicle window to be capable of preventing the dust, contaminant, etc. from being deposited on the tinted film for a vehicle window; and to be capable of realizing the advantage that when the tinted films for a vehicle window to be cut are of many types and a number of the films of each type is small, the tinted films for a vehicle window may be cut continuously.

In one aspect of the present disclosure, there is provided an apparatus for cutting a tinted film for a vehicle window, the apparatus comprising: a housing having a top portion, the housing having a cutting-line displaying/displayed plate as a front portion thereof, wherein the cutting-line displaying/displayed plate is configured to display a cutting line for the film thereon or to receive a beam corresponding to the cutting line for the film and allow the beam to be displayed thereon, wherein the cutting-line displaying/displayed plate is tilted such that the film is supported on the plate; a top horizontal extension from the top portion of the housing; a contaminant remover disposed on and beneath the top horizontal extension, wherein the contaminant remover includes a liquid sprayer disposed on and beneath the top horizontal extension to spray water particles or fogs downwardly toward the cutting-line displaying/displayed plate; a cutting-line formation device housed in the housing, wherein the cutting-line formation device is configured to send cutting line data for the film to the cutting-line displaying/displayed plate when the cutting-line displaying/displayed plate includes a display panel; or the cutting-line formation device is configured to irradiate a beam corresponding to the cutting line data onto the cutting-line displaying/displayed plate when the cutting-line formation device include a beam projector; and a film winding or unwinding unit disposed above the cutting-line displaying/displayed plate for winding or unwinding the tinted film for the vehicle window from or toward the cutting-line displaying/displayed plate.

In one implementation, the contaminant remover further includes a static-electricity based dust absorber disposed on and beneath the top horizontal extension to collect dusts or containments from a space in front of the cutting-line displaying/displayed plate.

In one implementation, the apparatus further comprises a screener depending on the top horizontal extension at a distal end thereof, wherein the screener is stretchable vertically downwardly or horizontally laterally, wherein the stretched screener backs the cutting-line displaying/displayed plate from external dusts or containments.

In one implementation, the cutting-line formation device include a controller and a memory coupled to the controller, wherein the memory stores therein cutting line data based on vehicle identifications, wherein the controller is configured to receive a vehicle identification from a vehicle detector and to fetch a specific cutting line data from the memory based on the received vehicle identification and to send the specific cutting line data to the display panel or the beam projector.

In one aspect of the present disclosure, there is provided a method for cutting a tinted film for a vehicle window, the method comprising: (a) detecting a vehicle identification by a vehicle detector and fetching first cutting line data from a memory based on the detected vehicle identification, wherein the memory has a relationship between multiple cutting line data and vehicle identifications; (b) adjusting size and/or color data for a cutting line corresponding to the first cutting line data using the input interface, thereby to generate a second cutting line data; (c) receiving the second cutting line data by a cutting-line displaying/displayed plate when the plate includes a display panel or by a beam-projector when the plate is free of the panel and is light-transmitting, wherein the plate is oriented in a tilted manner; (d) displaying a cutting line corresponding to the second cutting line data by the display panel on the plate or projecting a beam corresponding to the cutting line on the plate; (e) placing the tinted film on the tilted plate; (f) cutting the tinted film on the tilted plate along the cutting line indicated on the plate; (g) activating a liquid sprayer and/or a static-electricity based dust absorber to remove a dust or contaminant on and around the tinted film and the plate; and (h) detaching at least a portion of a paper attached onto the tinted film from an attachment face of the film, and applying a neutral detergent onto the attachment face, and attaching back the detached portion of the paper onto the attachment face.

In one implementation, the operation (e) includes: stretching or expanding or unfolding a screener in a front of the plate to block the plate from a dust or contaminant outside of the screener; and activating a film winding or unwinding unit to allow the tinted film wound around the unit to be unwound downwardly onto the tilted plate.

In one implementation, the memory stores therein additional cutting line data corresponding to shapes of a central rear mirror, a black box, a brake lamp, and/or or a wiper on a rear wind shield glass in association with the multiple cutting line data corresponding to shapes of a front and/or rear wind shield glass or door glasses of the vehicle, wherein the operation (a) includes: fetching additional cutting line data from the memory based on the detected vehicle identification by the controller; fetching a setting reference line from the memory based on the detected vehicle identification by the controller, wherein the memory further stores therein multiple positioning line data based on the vehicle identifications, wherein the setting reference line is a line along which a guide frame is positioned when the tinted film is cut; combining the additional cutting line data and the setting reference line with the first cutting line data by the controller, wherein the guide frame has a curved edge corresponding to a curved edge of a door glass of the vehicle.

Using the apparatus for cutting the tinted film for a vehicle window in accordance with the present disclosure, following advantages are obtained: the cutting operation may be performed behind the screener and the liquid sprayer or static-electricity based dust absorber may be activated to prevent the dust, contaminant, etc. from being deposited on the tinted film for a vehicle window; the neutral detergent may be applied onto the surface of the film to be attached such that when the tinted film for a vehicle window is attached on the wind shield glass or door glass of the vehicle, a dust, contaminant, etc. may be prevented from being deposited on the tinted film for a vehicle window on the surface thereof to be attached; when the vehicle enters the film cutting and attachment station, the vehicle detector may perform the vehicle detection, and determine vehicle information about the vehicle and send the information to the controller which in turn may receive the information and fetch the specific cutting line data from the memory based on the received information, and, then, the controller may transmit the fetched specific cutting line data to a display panel of the cutting-line displaying/displayed plate or to the beam projector of the cutting line formation device, thereby to avoid a manual input of the cutting line by the operator; and when the tinted films for a vehicle window to be cut are of many types and a number of the films of each type is small, the tinted films for a vehicle window may be cut continuously.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Figure 1:
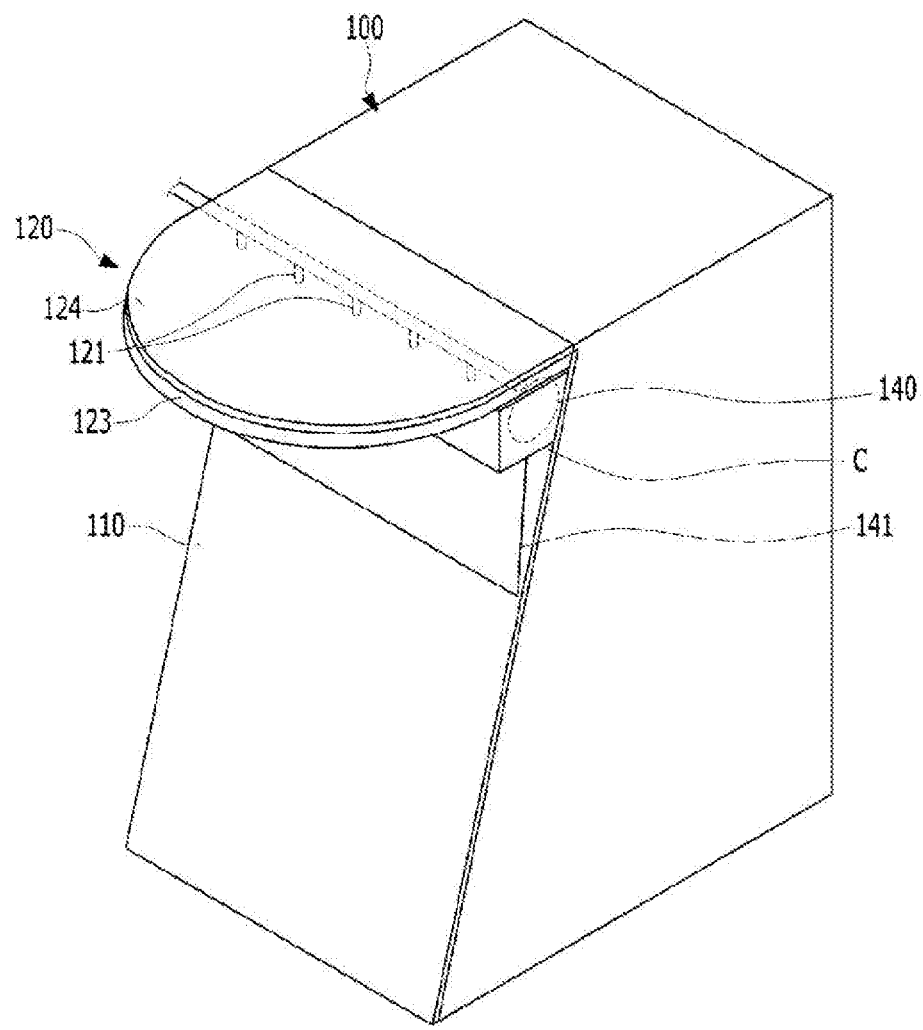
FIG. 1 and FIG. 2 are perspective views of an apparatus for cutting a tinted film for a vehicle window in accordance with one embodiment of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Figure 2:
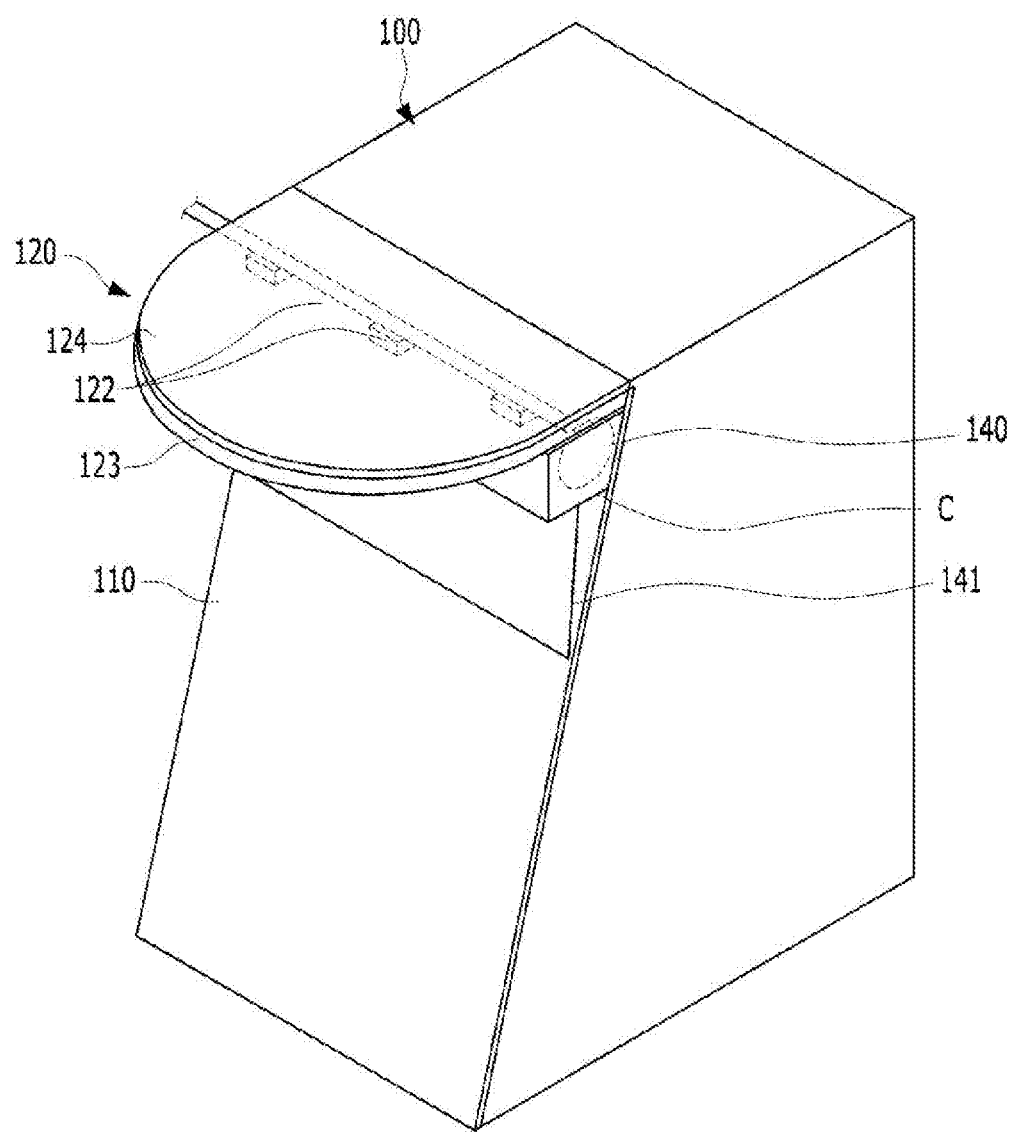
Figure 3:
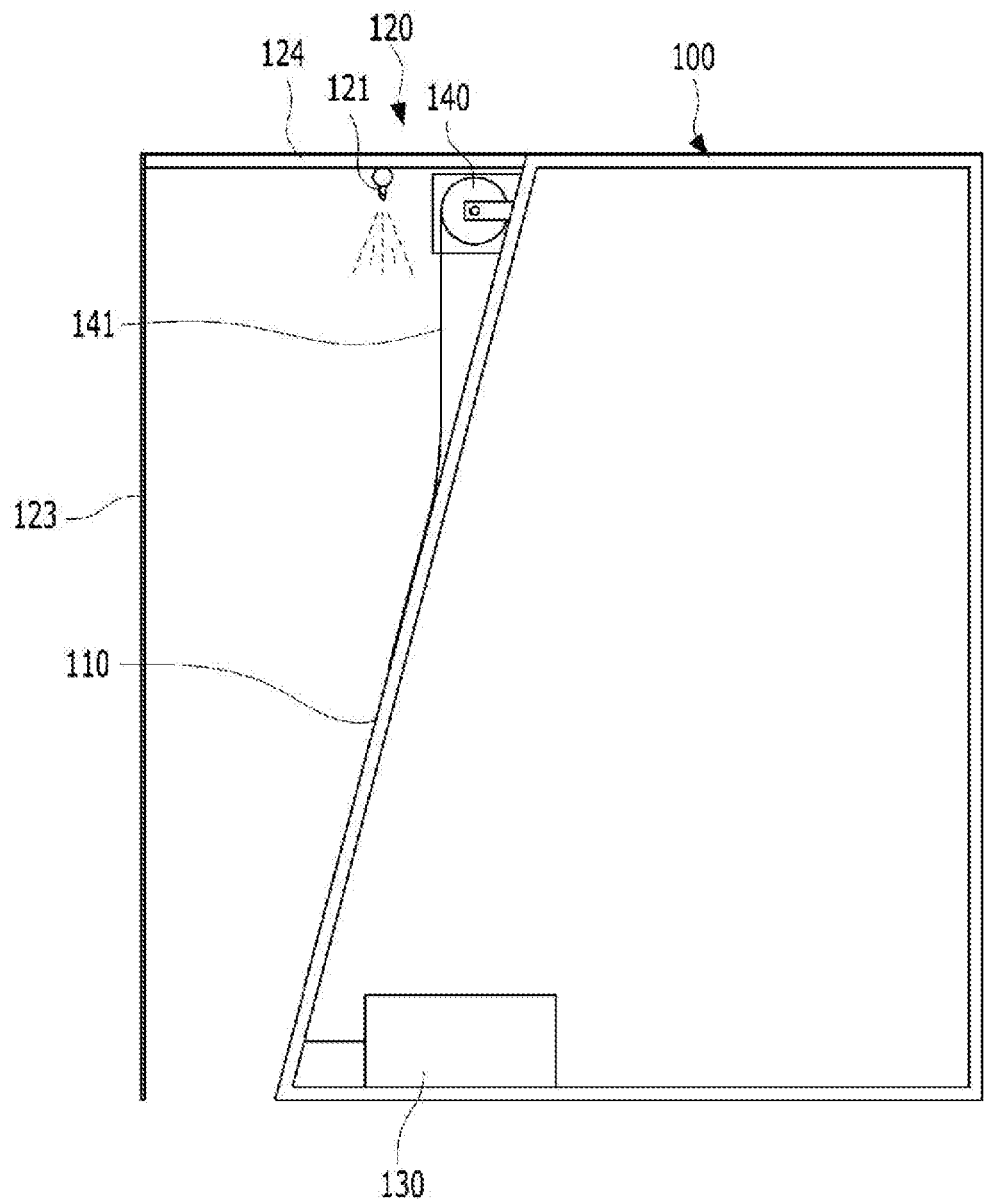
FIG. 3 is a side view of an apparatus for cutting a tinted film for a vehicle window in accordance with one embodiment of the present disclosure.

Referring to FIG. 1 to FIG. 3, an apparatus for cutting a tinted film for a vehicle window is shown wherein a cutting line is displayed on a tinted film for a vehicle window using a display unit. The apparatus for cutting a tinted film may have a housing 100.

The housing 100 may define a front tilted plate 110 on which a tinted film 141 for a vehicle window is placed.

In this connection, the cutting-line displaying/displayed plate 110 may be vertically tilted.

The cutting-line displaying/displayed plate 110 may be vertically tilted such the tinted film 141 for a vehicle window is rolled downwards and is supported on the cutting-line displaying/displayed plate 110. The cutting-line displaying/displayed plate 110 may display the cutting line directly or indirectly as described below. The cutting-line displaying/displayed plate 110 may support the tinted film 141 for a vehicle window.

The housing 100 may define the cutting-line displaying/displayed plate 110 as a front portion thereof. Further, the housing 100 may have a top plate. The cutting-line displaying/displayed plate 110 may extend downwardly from the top plate. A top horizontal extension 124 may extend horizontally from the top plate. A contaminant remover 120 be disposed on the top horizontal extension 124 on a bottom thereof. The contaminant remover 120 may face downwards. The contaminant remover 120 may include a liquid sprayer 121 to spray liquid particles downwards onto the cutting-line displaying/displayed plate 110. The liquid sprayer 121 may face downwards. Additionally or alternatively, the contaminant remover 120 may include a static-electricity based dust absorber 122 to absorb the dust from the cutting-line displaying/displayed plate 110.

In this connection, the contaminant remover 120 may be fixed to or hung on the top horizontal extension 124 to face downwards. Beneath and on the top horizontal extension 124, the liquid sprayer 121 or static-electricity based dust absorber 122 may be disposed.

The top horizontal extension 124 may extend beyond and from the top plate of the housing 100. Thus, the top horizontal extension 124 may act to block the cutting-line displaying/displayed tilted plate 110 from the above. This may prevent the dusts or contaminants from being deposited on the cutting-line displaying/displayed tilted plate 110 and, thus, the film thereon.

Further, a screener 123 may depend on the top horizontal extension 124 at a distal end thereof and may extend downwardly. The screener 123 may act to block the cutting-line displaying/displayed tilted plate 110 from the front side. This may further prevent the dusts or contaminants from being deposited on the cutting-line displaying/displayed tilted plate 110 and, thus, the film thereon.

Thus, the screener 123 may be folded or unfolded; or rolled or unrolled; or stretched or retracted. When the screener 123 may be stretched downwardly, the liquid sprayer 121 may spray water particles or water fogs or water streams downwardly into a space between the screener 123 and the cutting-line displaying/displayed tilted plate 110, and/or the static-electricity based dust absorber 122 may collect the dust from the space between the cutting-line displaying/displayed tilted plate 110 and the screener 123. In this way, the dust or contaminant may be prevented from being deposited on the tinted film 141 for a vehicle window on the cutting-line displaying/displayed tilted plate 110.

Referring to FIG. 4 to FIG. 8, the housing 100 may accommodate a cutting-line formation device 130 therein. The cutting-line formation device 130 may be configured to allow the cutting line to be indicated on the cutting-line displaying/displayed plate 110.

In this connection, the cutting-line formation device 130 may be embodied as a beam projector in one embodiment. The cutting-line formation device 130 may include or be coupled to a controller 131, a memory 132 and an input interface 133. In this connection, the cutting-line formation device 130 may include or be coupled to a vehicle detector 134. The vehicle detector 134 may detect information about an applicable vehicle. Thus, the vehicle detector 134 may send the detected vehicle information to the controller 131. Then, the controller 131 may fetch the reference vehicle data from the memory 132 based on the detected vehicle information. Then, based on the fetched reference vehicle data, the controller 131 may generate a cutting line to be indicated on the cutting-line displaying/displayed tilted plate 110. Further, the operator may use the input interface 133 to further adjust details such as a size or color on the cutting line, which in turn may be inputted to the controller 131.

Figure 7:
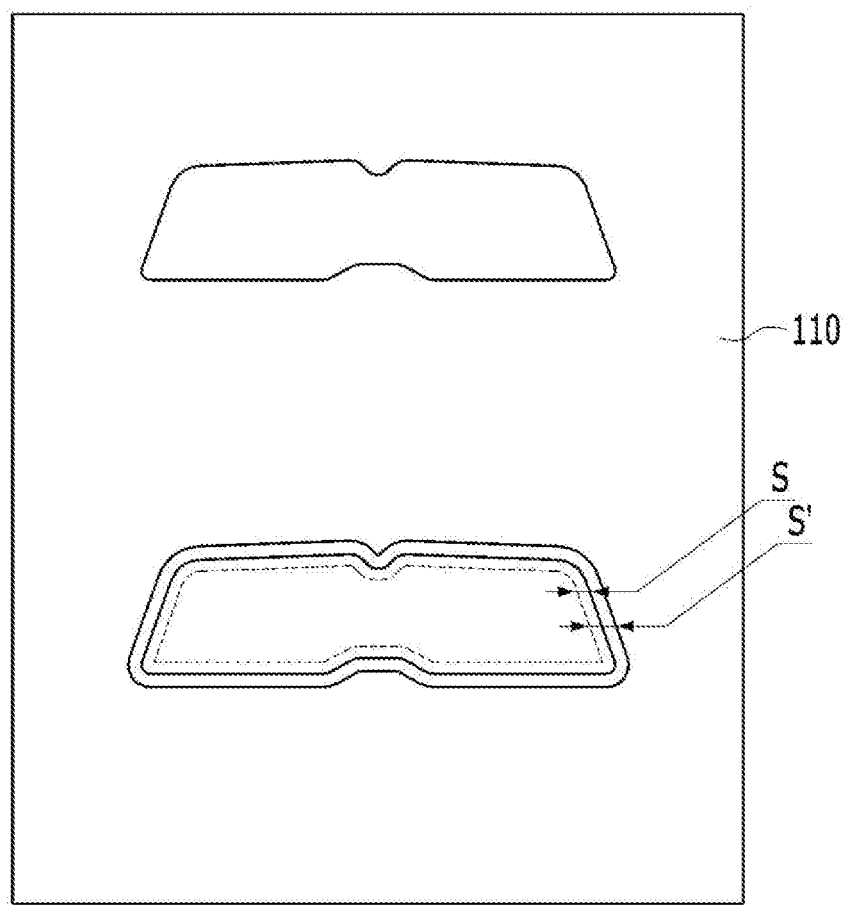

Further, using the input interface 133, the operator may scale up or down the cutting line S or S' as shown in FIG. 7. For example, this cutting line may correspond to a contour of a front or rear wind shield glass or door glass.

Furthermore, the vehicle detector 134 may detect information about an applicable vehicle. Thus, the vehicle detector 134 may send the detected vehicle information to the controller 131. Then, the controller 131 may fetch the reference vehicle data from the memory 132 based on the detected vehicle information. Then, based on the fetched reference vehicle data, the controller 131 may generate a setting reference line L to be indicated on the cutting-line displaying/displayed tilted plate 110.

Figure 8:
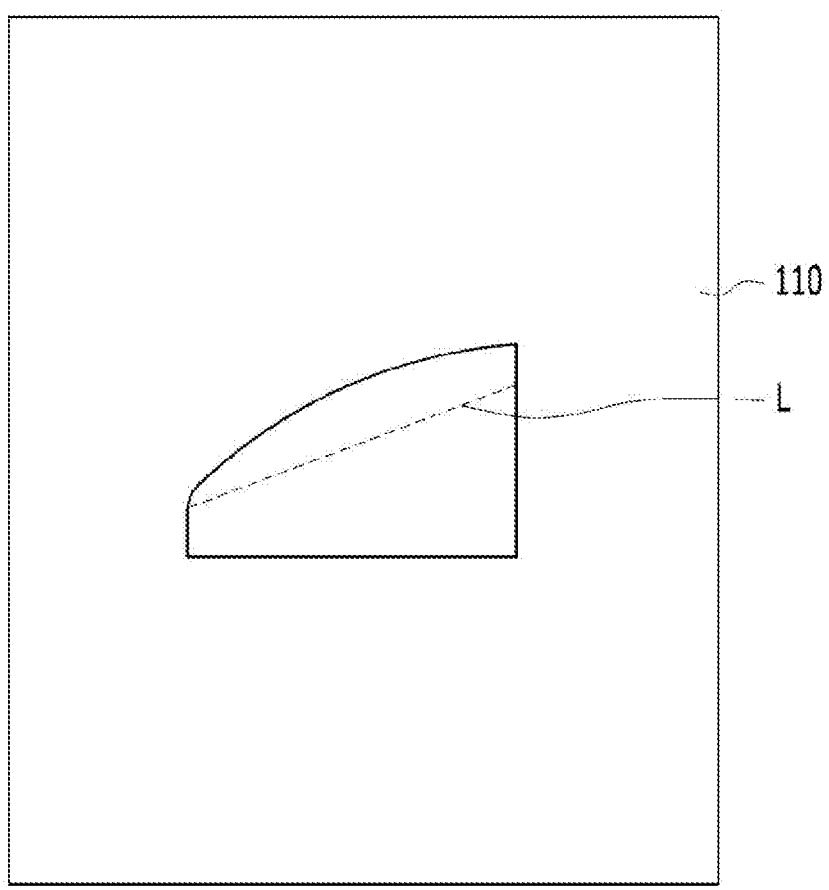
Figure 12:
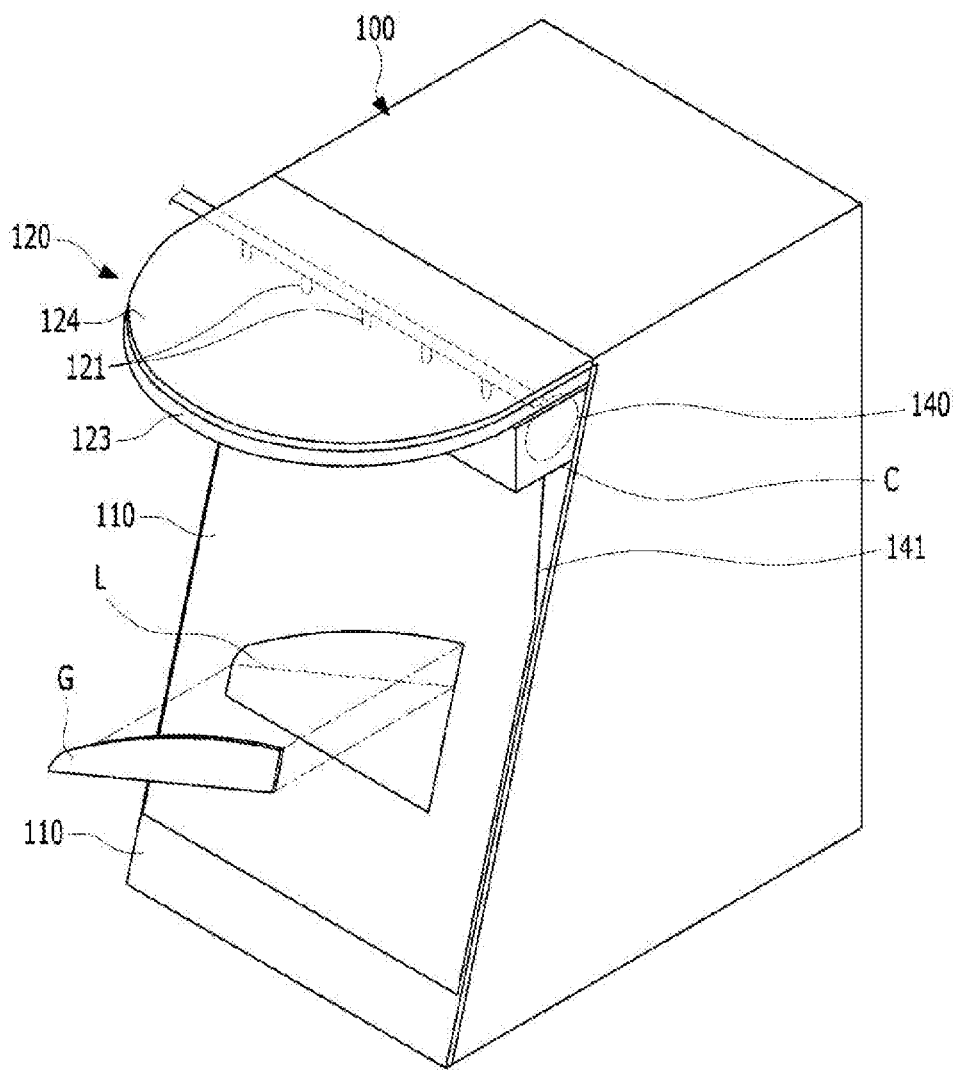
FIG. 12 is a perspective view of an example use of an apparatus for cutting a tinted film for a vehicle window in accordance with one embodiment of the present disclosure.

In this connection, the setting reference line L may refer to a guide line along which a guide frame G is positioned when the tinted film 141 for a vehicle window is cut away. To be specific, in order to improve the cutting accuracy of the tined film 141 corresponding to, for example, a door glass having a curved top line, the guide frame G having an edge line corresponding to the curved top line of the door glass may be positioned on the tined film 141 such that a straight edge line of the guide frame G coincides with the setting reference line L as shown in FIG. 8 and FIG. 12. As shown in FIG. 8 and FIG. 12, the door glass shape has the curved top line, a left short vertical straight line, a right long vertical straight line, a horizontal bottom line. In this connection, the setting reference line L may extend as a straight line between one point at the left line and another point in the right line. The guide frame G may be positioned between the curved top line and the setting reference line L. In this away, the curved top line of the tinted film to correspond to the curved top line of the door glass may be precisely cut.

Thus, using the controller 131, the memory 132, and the vehicle detector 134, the information about various glasses for various vehicles may be automatically obtained and, then, based on the information, a cutting line for the tinted film may be automatically determined. Further, using the input interface 133, the size or brightness or color, etc. for the cutting line may be adjusted by the operator to facilitate the cutting operation for the tined film.

Further, the cutting-line formation device 130 may be implemented as a beam projector B in one embodiment. In this connection, the cutting-line displaying/displayed plate 110 may be made of a material to allow beam-transmittance, for example, a glass. Based on the cutting line data received from the controller 131, the beam projector B may be configured to project the beam corresponding to the cutting line on the cutting-line displaying/displayed plate 110 on which the tinted film 141 for a vehicle window is placed. Thus, the beam type cutting line may be displayed or indicated on the cutting-line displaying/displayed plate 110.

In one embodiment, the cutting-line formation device 130 may dispense with the beam projector B. That is, the cutting-line formation device 130 may include the controller 131 and the memory 132 and the vehicle detector 134 and the cutting-line displaying/displayed plate 110 may act as or include a cutting-line displaying device. In this connection, the cutting-line displaying/displayed plate 110 may act as or include a display panel including LED, OLED, LCD, PCP, etc. In this connection, the controller 131 of the cutting-line formation device 130 may send the cutting line information to the display panel, which, in turn, may display the cutting-line based on the cutting line information.

Figure 5:
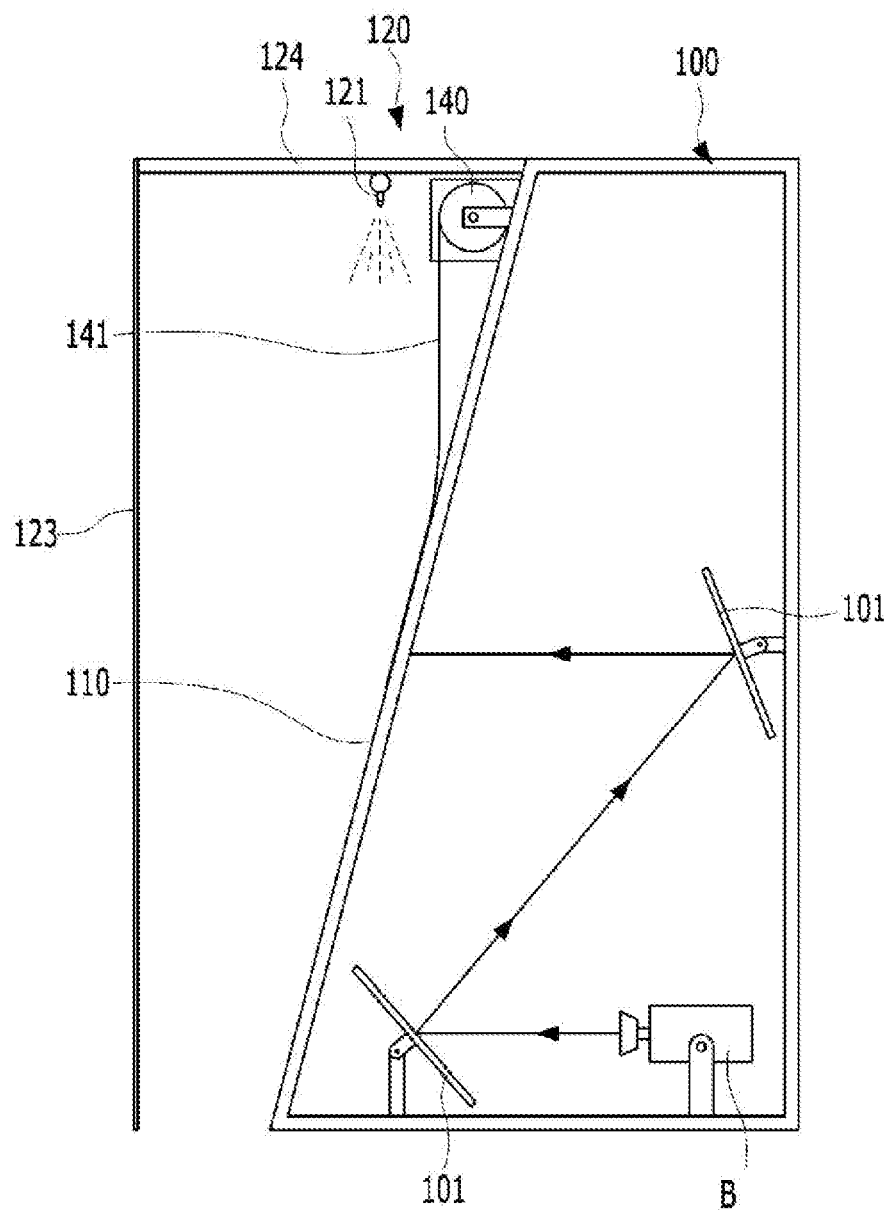
FIG. 5 is a side view of an apparatus for cutting a tinted film for a vehicle window in accordance with one embodiment of the present disclosure.
Figure 6:
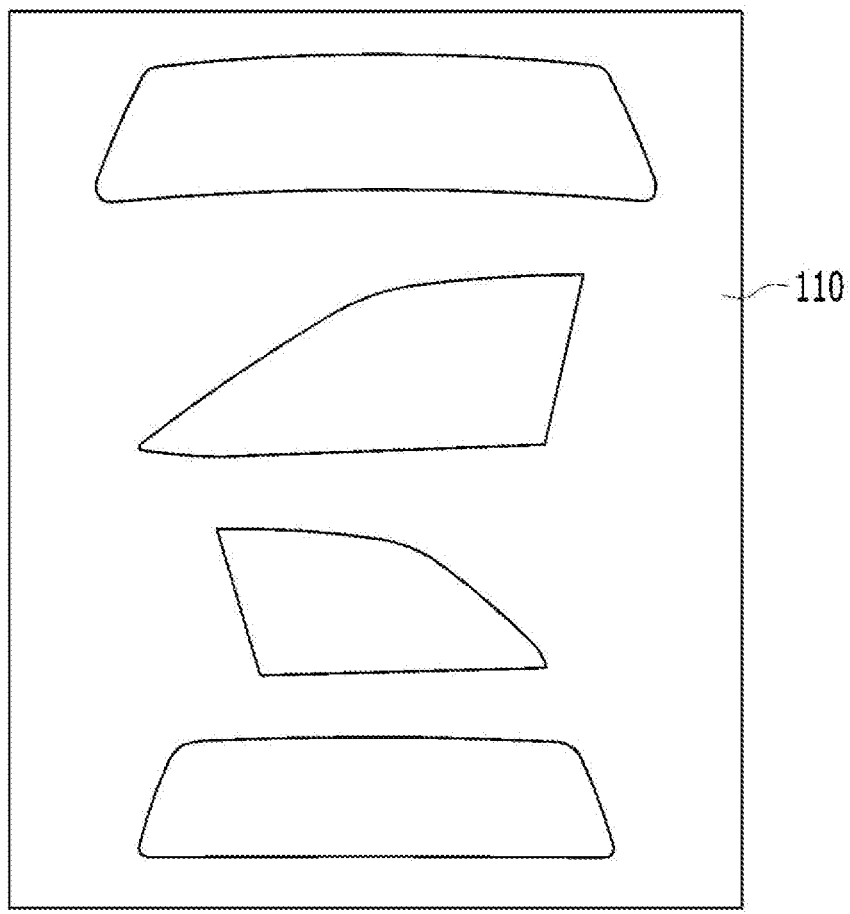
FIG. 6 to FIG. 8 are front views for describing an apparatus for cutting a tinted film for a vehicle window in accordance with one embodiment of the present disclosure.

When the cutting-line formation device 130 includes or is embodied as the beam projector B as shown in FIG. 5, the beam projector B is located in the housing 100 on a bottom thereof, and a beam from the beam projector B may be incident onto reflection units 101. As shown in FIG. 5, the beam is reflected from a first reflection unit, or mirror 101 upwardly and then the beam is reflected from a second reflection unit, or mirror 101 horizontally. However, the arrangement of the reflection units may not be limited thereto. Finally, the beam may be irradiated onto the cutting-line displaying/displayed plate 110 onto the rear face thereof. This configuration may allow reduction of the width of the housing 100.

The housing 100 may receive a film winding or unwinding unit 140 at a top of the cutting-line displaying/displayed plate 110 to wind or unwind the tinted film 141 for a vehicle window around the same downwardly or upwardly. The position of the film winding or unwinding unit 140 is not limited thereto. When the cutting line is indicated on the cutting-line displaying/displayed plate 110, the tinted film 141 for a vehicle window is unwound from the film winding or unwinding unit 140 downwardly and then runs on the cutting-line displaying/displayed plate 110 on the tilted face thereof.

In this connection, the film winding or unwinding unit 140 may be rotatably coupled to the housing 100. The film winding or unwinding unit 140 is positioned or sized or oriented such that the tinted film 141 may be easily attached to or detached from the film winding or unwinding unit 140.

Further, the film winding or unwinding unit 140 may be housed in a horizontally elongate case C as shown in FIG. 2. The horizontally elongate case C may be positioned beneath and on the top horizontal extension 120. Thus, the horizontally elongate case C may have a horizontally elongate bottom opening through which the tinted film 141 for a vehicle window runs downwardly from the film winding or unwinding unit 140 when the cutting line is indicated on the plate 110. In this connection, when the cutting operation is not activated, the tinted film 141 for a vehicle window may be accommodated in the elongate case C. Thus, the tinted film 141 may be protected from the dust, contaminant, etc.

Figure 9:
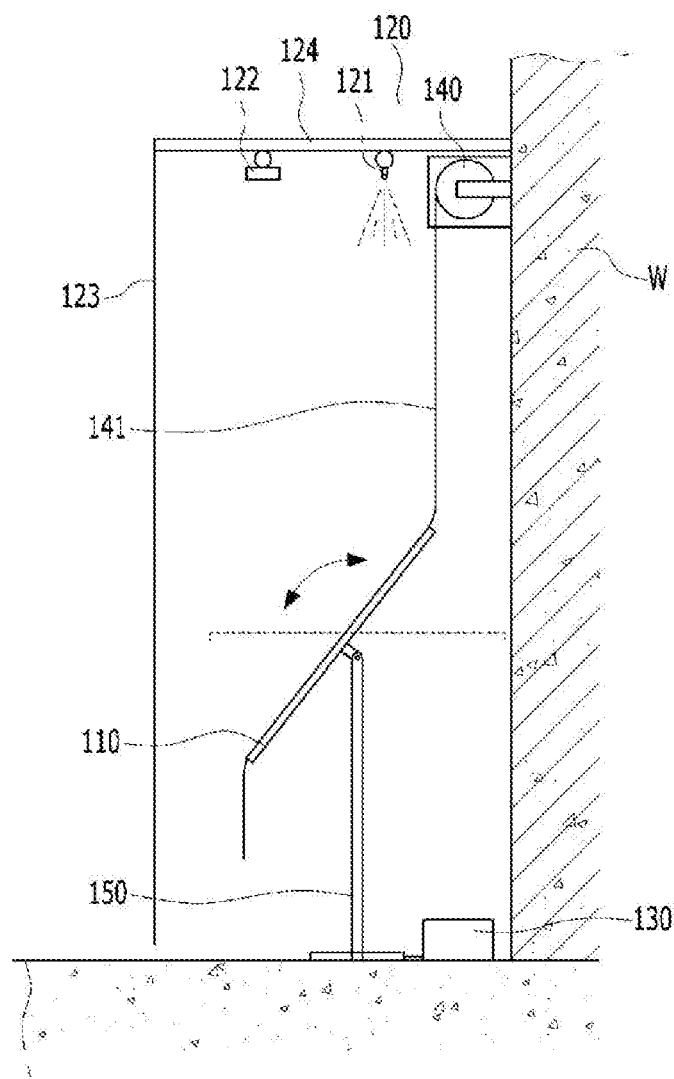
FIG. 9 is a side view of an apparatus for cutting a tinted film for a vehicle window in accordance with another embodiment of the present disclosure.

In FIG. 9, an apparatus for cutting a tinted film for a vehicle window in accordance with another embodiment may have the cutting-line displaying/displayed plate 110 acting as or including a display panel including LED, OLED, LCD, PDP, etc. In this connection, the controller 131 of the cutting-line formation device 130 may send the cutting line information to the display panel, which, in turn, may display the cutting-line based on the cutting line information. In this embodiment, the cutting-line displaying/displayed plate 110 may be supported by a support 150 and may be pivotally coupled to the support 150. Thus, the cutting-line displaying/displayed plate 110 may be pivoted on the support 150 so as to be tilted. The tinted film 141 for a vehicle window may run on and supported by the cutting-line displaying/displayed plate 110. The pivotal angle of the cutting-line displaying/displayed plate 110 relative to the support 150 may depend on a cutting operation environment or cutting tool type or operator body size, etc.

Thus, not only the cutting-line displaying/displayed plate 110 may be tilted during the cutting operation but also the cutting-line displaying/displayed plate 110 may be oriented in a parallel manner to the ground during the cutting operation.

Moreover, when the support 150 supports the cutting-line displaying/displayed plate 110, the housing may be omitted. Further, when the cutting-line displaying/displayed plate 110 is oriented in a perpendicular manner to the ground, the present apparatus has a reduction of the width and the storage space of the apparatus may be minimized. Further, the support 150 may be mobile to the desired location.

Furthermore, in this embodiment, the apparatus for cutting a tinted film for a vehicle window may have a top horizontal extension 124 secured to a wall W of the cutting room in which a combination of the cutting-line displaying/displayed plate 110 and the support 150 is placed, as shown in FIG. 9. In this connection, the contaminant remover 120 including the liquid sprayer 121 or static-electricity based dust absorber 122 may be disposed on and beneath the top horizontal extension 124 to face downwards. The screener 123 may depend from the distal end of the top horizontal extension 124 to be stretchable downwards.

In this connection, under the horizontal extension 124, the elongate case C may be secured to the wall W. The film winding or unwinding unit 140 may be housed in the elongate case C. Under the contaminant remover 120, the cutting-line displaying/displayed plate 110 may be placed. Between the screener 123 and the wall W, a cutting operation space may be defined. In this connection, a vertical spacing between the cutting-line displaying/displayed plate 110 and the film winding or unwinding unit 140 may depend on the spraying rate or dust absorption rate of the liquid sprayer 121 or static-electricity based dust absorber 122.

Hereinafter, a cutting method of the tinted film using the apparatus for cutting a tinted film for a vehicle window defined above will be described below.

Figure 10:
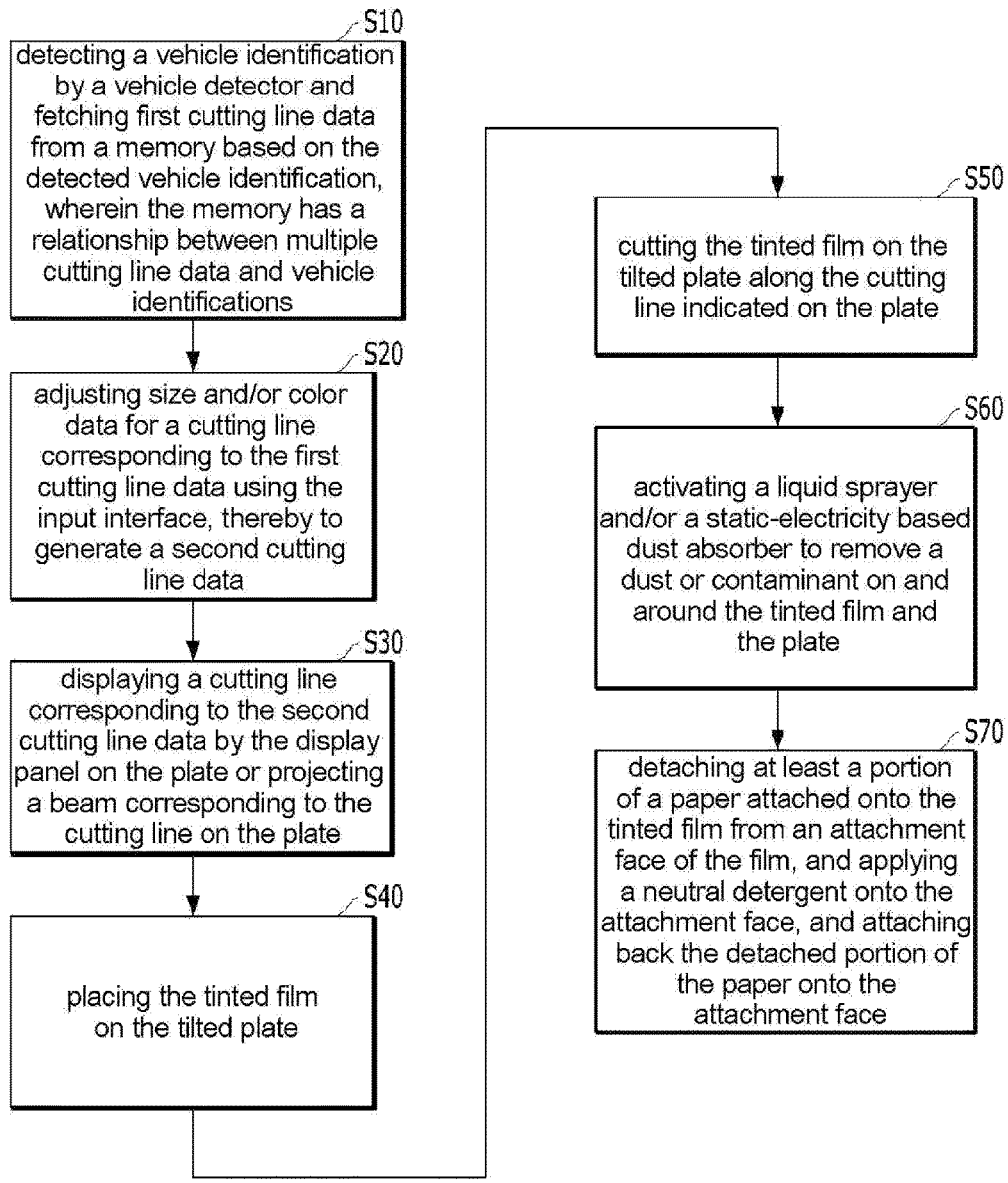
FIG. 10 and FIG. 11 are flow charts for describing an operation of an apparatus for cutting a tinted film for a vehicle window in accordance with one embodiment of the present disclosure.

Referring to FIG. 10, a cutting method of the tinted film using the apparatus for cutting a tinted film for a vehicle window defined above may include a vehicle detection and data transmission operation S10, a cutting line formation operation S20, a cutting line displaying operation S30, a film placement operation S40, a film cutting operation S50, a contaminant removing operation S60, and a neutral detergent application operation S70.

Vehicle Detection and Data Transmission Operation S10

Figure 4:
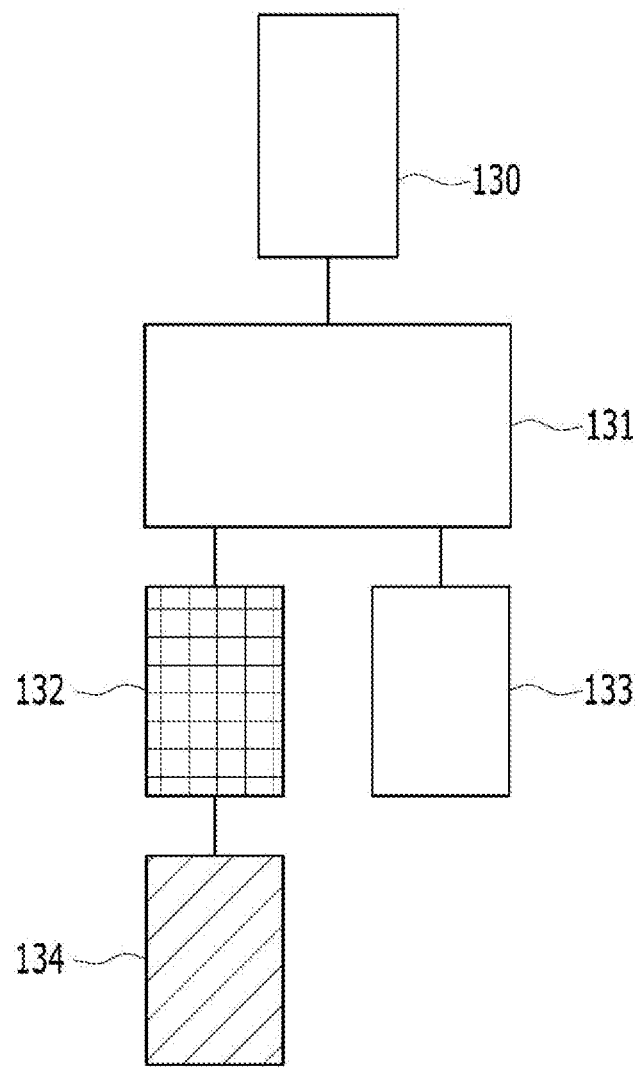
FIG. 4 is a block diagram for describing an apparatus for cutting a tinted film for a vehicle window in accordance with one embodiment of the present disclosure.

Referring to FIG. 4, in a vehicle detection and data transmission operation S10, a vehicle enters the film cutting and attachment station and then the vehicle detector 134 may perform the vehicle detection, and determine vehicle information about the vehicle and send the information to the controller 131.

Then, the controller 131 may receive the information and fetch the specific cutting line data from the memory 132 based on the received information. Then, the controller 131 may transmit the fetched specific cutting line data to a display panel of the cutting-line displaying/displayed plate 110 or to the beam projector of the cutting line formation device 130.

Further, the controller 131 may transmit the fetched specific cutting line data to a separate display device disposed in the film cutting and attachment station.

Moreover, when a new vehicle is available in the market, the memory 132 may be updated to have new cutting-line data for the tinted film for wind shield glasses or door glasses for the new vehicle.

In this connection, the memory 132 may store therein additional cutting line data corresponding to shapes of a central rear mirror, a black box, a brake lamp, or a wiper on a rear wind shield glass, etc. in association with the primary cutting line data corresponding to shapes of the front and/or rear wind shield glass or the door glasses. Thus, when the vehicle enters the film cutting and attachment station and then the vehicle detector 134 may perform the vehicle detection, and determine vehicle information about the vehicle and send the information to the controller 131. Then, the controller 131 may receive the information and fetch the specific primary cutting line data together with the specific additional cutting line data from the memory 132 based on the received information. Then, the controller 131 may transmit the fetched specific primary cutting line data together the specific additional cutting line data to a display panel of the cutting-line displaying/displayed plate 110 or to the beam projector of the cutting line formation device 130. Thus, a primary cutting line corresponding to the specific primary cutting line data may be indicated on the cutting-line displaying/displayed plate 110 while the additional cutting line corresponding to the specific additional cutting line data may be indicated on the cutting-line displaying/displayed plate 110 in association with the primary cutting line. That is, the additional cutting line may be added to the primary cutting line.

Furthermore, the vehicle detector 134 may detect information about an applicable vehicle. Thus, the vehicle detector 134 may send the detected vehicle information to the controller 131. Then, the controller 131 may fetch the specific vehicle data from the memory 132 based on the detected vehicle information. Then, based on the fetched specific vehicle data, the controller 131 may be further configured to generate the setting reference line L to be indicated on the cutting-line displaying/displayed tilted plate 110.

In this connection, the setting reference line L may refer to a guide line along which a guide frame G is positioned when the tinted film 141 for a vehicle window is cut away. To be specific, in order to improve the cutting accuracy of the tined film 141 corresponding to, for example, a door glass having a curved top line, the guide frame G having an edge line corresponding to the curved top line of the door glass may be positioned on the tined film 141 such that a straight edge line of the guide frame G coincides with the setting reference line L as shown in FIG. 8 and FIG. 12. As shown in FIG. 8 and FIG. 12, the door glass shape has the curved top line, a left short vertical straight line, a right long vertical straight line, a horizontal bottom line. In this connection, the setting reference line L may extend as a straight line between one point at the left line and another point in the right line. The guide frame G may be positioned between the curved top line and the setting reference line L. In this away, the curved top line of the tinted film to correspond to the curved top line of the door glass may be precisely cut.

Cutting Line Formation Operation S20

After the vehicle detection and data transmission operation S10, a cutting line formation operation S20 may be carried out where the operator may adjust a size or color of the cutting line using the input interface 133. To be specific, the operator may input a specific size or color of the cutting line into the controller 131 using the input interface 133. The cutting line is to be indicated on the cutting-line displaying/displayed plate 110.

Moreover, using the input interface 133, the operator may select one specific cutting line among cutting lines corresponding to front and rear wind shield glasses and door glasses. In this connection, the operator may input a specific size or color for the selected cutting line into the controller 131 using the input interface 133. For example, using the input interface 133, the operator may enlarge or reduce the cutting line S and S'. To this end, the input interface 133 may be connected to the controller to receive the cutting line data from the controller. Then, the operator may manipulate the cutting line data on the user interface 133. This may lead to efficient attachment of the tinted film 141 for a vehicle window on the selected vehicle glass.

Further, the operator may consider a color of the tinted film 141 for a vehicle window during the cutting line formation operation S20. That is, in order to realize a contrast of the cutting line over the color of the tinted film 141 for a vehicle window, the operator may select a color of the cutting line using the interface 133. When the cutting line indicates two or more shapes, two or more colors may be selected for the two or more shapes respectively.

Moreover, when the cutting-line formation device 130 includes or is coupled to or is embodied as the beam projector B, the operator may adjust a transmittance of the beam from the beam projector B with consideration of the optical property of the tinted film 141 for a vehicle window.

Furthermore, when the operator inputs various data to the controller 131 using the input interface 133, the operator may input the various data not many times but one time. Thus, when the tinted films 141 for a vehicle window to be cut are of many types and a number of the films of each type is small, the tinted films 141 for a vehicle window may be cut continuously.

Cutting Line Displaying Operation S30

After the cutting line formation operation S20, the cutting line displaying operation S30 may be carried out where the controller 131 may allow the cutting-line formation device 130 to display the cutting line on the cutting-line displaying/displayed plate 110.

In this connection, in the cutting line displaying operation S30, in one embodiment, the beam projector B may irradiate a beam corresponding to the cutting line data from the controller 131 onto the cutting-line displaying/displayed plate 110. In another embodiment, where the cutting-line displaying/displayed plate 110 includes a display panel, the display panel may display the cutting line beam corresponding to the cutting line data from the controller 131 thereon. When the beam projector B may irradiate the beam, the beam may transmit the cutting-line displaying/displayed plate 110 and then tinted film 141 for a vehicle window on the cutting-line displaying/displayed plate 110 and thus may be visible to the operator.

Film Placement Operation S40

After the cutting line displaying operation S30, the film placement operation S40 may be carried out where the tinted film 141 for a vehicle window to be cut may be placed on the tilted cutting-line displaying/displayed plate 110.

Figure 11:
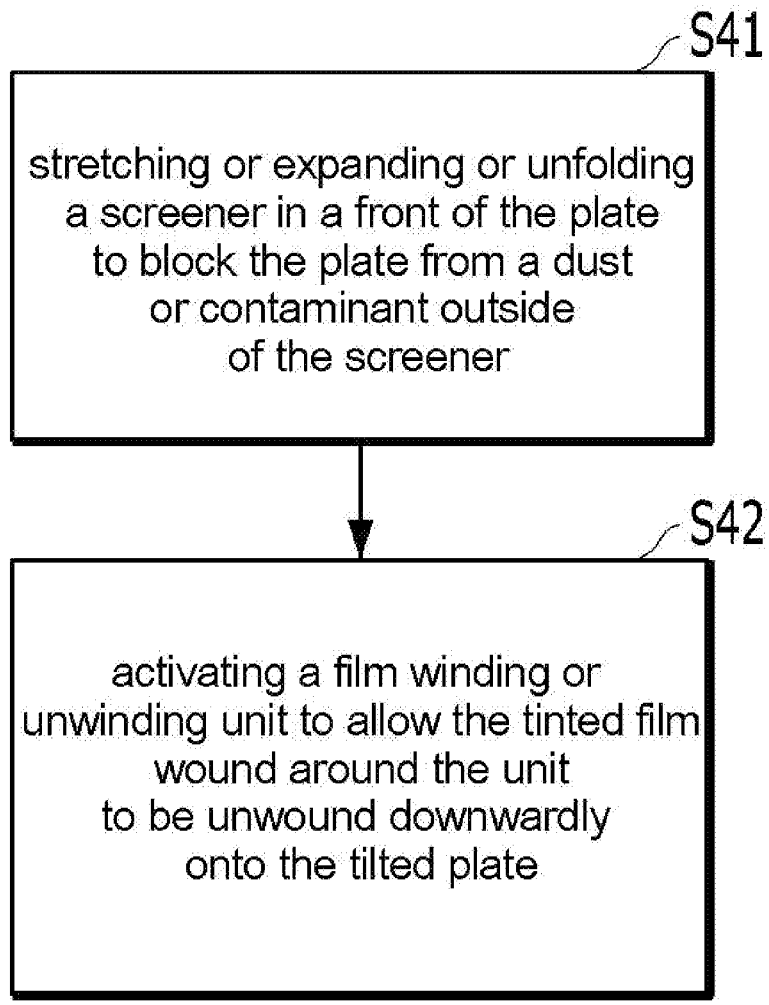

FIG. 11 shows details of the film placement operation S40. The film placement operation S40 may include a contaminant blocking operation S41, and a film conveying operation S42.

Contaminant Blocking Operation S41

After the cutting line displaying operation S30, the contaminant blocking operation S41 may be carried out where the screener 123 is stretched or unfolded or expanded to bock the cutting-line displaying/displayed plate 110 from an ambient air containing the dust, contaminant, etc.

Film Conveying Operation S42

After the contaminant blocking operation S41, the film conveying operation S42 may be carried out where the tinted film 141 for a vehicle window to be cut may be unwound downwardly from the film winding or unwinding unit 140 and thus run on and be placed the cutting-line displaying/displayed plate 110 on or in which the cutting line is indicated.

Although the film placement operation S40 includes the contaminant blocking operation S41 and the film conveying operation S42 in this order, the film placement operation S40 includes the film conveying operation S42 and the contaminant blocking operation S41 in this order.

Film Cutting Operation S50

After the film placement operation S40 including the contaminant blocking operation S41 and the film conveying operation S42, the film cutting operation S50 may be carried out where the tinted film 141 for a vehicle window placed on the cutting-line displaying/displayed plate 110 is cut along the cutting line.

In this connection, in the film cutting operation S50, the tinted film 141 for a vehicle window placed on the cutting-line displaying/displayed plate 110 is cut along the cutting line using a conventional cutting tool, such as, a cutting knife.

Further, as shown in FIG. 12, the guide frame G may be positioned on the tinted film 141 for a vehicle window placed on the cutting-line displaying/displayed plate 110 in order to improve cutting accuracy. In this regard, the guide frame G may be positioned along the setting reference line L.

In this connection, the setting reference line L may refer to a guide line along which the guide frame G is positioned when the tinted film 141 for a vehicle window is cut away. To be specific, in order to improve the cutting accuracy of the tined film 141 corresponding to, for example, a door glass having a curved top line, the guide frame G having an edge line corresponding to the curved top line of the door glass may be positioned on the tined film 141 such that a straight edge line of the guide frame G coincides with the setting reference line L as shown in FIG. 8 and FIG. 12. As shown in FIG. 8 and FIG. 12, the door glass shape has the curved top line, a left short vertical straight line, a right long vertical straight line, a horizontal bottom line. In this connection, the setting reference line L may extend as a straight line between one point at the left line and another point in the right line. The guide frame G may be positioned between the curved top line and the setting reference line L. In this away, the curved top line of the tinted film to correspond to the curved top line of the door glass may be precisely cut.

Contaminant Removing Operation S60

After the film cutting operation S50, the contaminant removing operation S60 may be carried out where the contaminant remover 120 such as the liquid sprayer 121 or static-electricity based dust absorber 122 may be activated to remove the dust, contaminant, etc. from a space in a front of the tinted film 141 for a vehicle window on the tilted cutting-line displaying/displayed plate 110.

Neutral Detergent Application Operation S70

After the contaminant removing operation S60, the neutral detergent application operation S70 may be carried out where a paper attached on the tinted film 141 for a vehicle window is partially detached from the film 141 by more than ⅔ portion of the entire paper and, then, a neutral detergent is applied onto the rear face of the tinted film 141 for a vehicle window from which the paper is detached, and, then, the partially detached paper is back attached on the tinted film 141 for a vehicle window.

Thus, when the paper is detached from the tinted film 141 for a vehicle window in order to attach the tinted film 141 for a vehicle window on the wind shield glass or door glass of the vehicle, a dust, contaminant, etc. may be prevented from being deposited on the tinted film 141 for a vehicle window.

Using the apparatus for cutting the tinted film for a vehicle window in accordance with the present disclosure, following advantages are obtained: the cutting operation may be performed behind the screener and the liquid sprayer or static-electricity based dust absorber may be activated to prevent the dust, contaminant, etc. from being deposited on the tinted film for a vehicle window; the neutral detergent may be applied onto the surface of the film to be attached such that when the tinted film for a vehicle window is attached on the wind shield glass or door glass of the vehicle, a dust, contaminant, etc. may be prevented from being deposited on the tinted film for a vehicle window on the surface thereof to be attached; when the vehicle enters the film cutting and attachment station, the vehicle detector may perform the vehicle detection, and determine vehicle information about the vehicle and send the information to the controller which in turn may receive the information and fetch the specific cutting line data from the memory based on the received information, and, then, the controller may transmit the fetched specific cutting line data to a display panel of the cutting-line displaying/displayed plate or to the beam projector of the cutting line formation device, thereby to avoid a manual input of the cutting line by the operator; and when the tinted films for a vehicle window to be cut are of many types and a number of the films of each type is small, the tinted films for a vehicle window may be cut continuously.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A method for cutting a tinted film for a vehicle window, the method comprising:
   (a) detecting a vehicle identification by a vehicle detector and fetching first cutting line data from a memory based on the detected vehicle identification, wherein the memory has a relationship between multiple cutting line data and vehicle identifications;
   (b) adjusting size and/or color data for a cutting line corresponding to the first cutting line data using an input interface, thereby to generate a second cutting line data;
   (c) receiving the second cutting line data by a cutting-line displaying/displayed plate when the plate includes a display panel or by a beam-projector when the plate is free of the panel and is light-transmitting, wherein the plate is oriented in a tilted manner;
   (d) displaying a cutting line corresponding to the second cutting line data by the display panel on the plate or projecting a beam corresponding to the second cutting line on the plate;
   (e) placing the tinted film on the tilted plate;
   (f) cutting the tinted film on the tilted plate along the cutting line indicated on the plate;
   (g) activating a liquid sprayer and/or a static-electricity based dust absorber to remove a dust or contaminant on and around the tinted film and the plate; and
   (h) detaching at least a portion of a paper attached onto the tinted film from an attachment face of the film, and applying a neutral detergent onto the attachment face, and attaching back the detached portion of the paper onto the attachment face, wherein the memory stores therein additional cutting line data corresponding to shapes of a central rear mirror, a black box, a brake lamp, and/or or a wiper on a rear wind shield glass in association with the multiple cutting line data corresponding to shapes of a front and/or rear wind shield glass or door glasses of the vehicle, wherein the operation (a) includes:

fetching the additional cutting line data from the memory based on the detected vehicle identification by a controller;

fetching a setting reference line from the memory based on the detected vehicle identification by the controller, wherein the setting reference line is a line along which a guide frame is positioned when the tinted film is cut, and the guide frame has a curved edge corresponding to a curved edge of a door glass of the vehicle and is positioned on the tinted film such that a straight edge line of the guide frame coincides with the setting reference line indicated on the cutting-line displaying/displayed plate;

combining the additional cutting line data and the setting reference line with the first cutting line data by the controller.

2. The method of claim 1, wherein the operation (e) includes:
   stretching or expanding or unfolding a screener in a front of the plate to block the plate from a dust or contaminant outside of the screener; and
   activating a film winding or unwinding unit to allow the tinted film wound around the unit to be unwound downwardly onto the tilted plate.

* * * * *